United States Patent [19]

Kindall

[11] 4,250,581
[45] Feb. 17, 1981

[54] BEE FEEDING APPARATUS

[76] Inventor: Harvey L. Kindall, Box 711, White Sulpher Springs, Mont. 59645

[21] Appl. No.: 50,120

[22] Filed: Jun. 19, 1979

[51] Int. Cl.³ .............................................. A01K 53/00
[52] U.S. Cl. .................................................... 6/5
[58] Field of Search .................................. 6/5, 3, 1

[56] References Cited

U.S. PATENT DOCUMENTS

| | | | |
|---|---|---|---|
| 1,056,783 | 3/1913 | Enhelder | 6/5 |
| 1,116,923 | 11/1914 | Rahn | 6/5 |
| 3,835,487 | 9/1974 | Grigg | 6/5 |

Primary Examiner—Hugh R. Chamblee
Attorney, Agent, or Firm—Arthur L. Urban

[57] ABSTRACT

A bee feeding apparatus including a container formed of a shock resistant plastic material and having a configuration including major top and bottom portions of a size substantially the same as the top opening of a beehive, the edges of the top and bottom portions being joined by sidewall portions having a height substantially less than the width thereof, the top and bottom portions being joined with sidewall portions in a curved section of substantial radius, the top portion including a plurality of raised rib sections symmetrically disposed about a recessed central section, the bottom portion including a raised central opening of a size slightly less than the recessed central section of the top portion, the bottom portion including a plurality of recessed rib sections symmetrically disposed about the raised central opening thereof, the recessed rib sections being of a size slightly larger than the corresponding raised rib sections of the top portion, a plurality of reinforcing members extending from the top portion to the bottom portion at points intermediate of the sidewall portions, a cover member with a plurality of substantially uniform openings disposed over the raised central opening and a mechanism for securing the cover to the central opening.

8 Claims, 3 Drawing Figures

U.S. Patent
Feb. 17, 1981
4,250,581
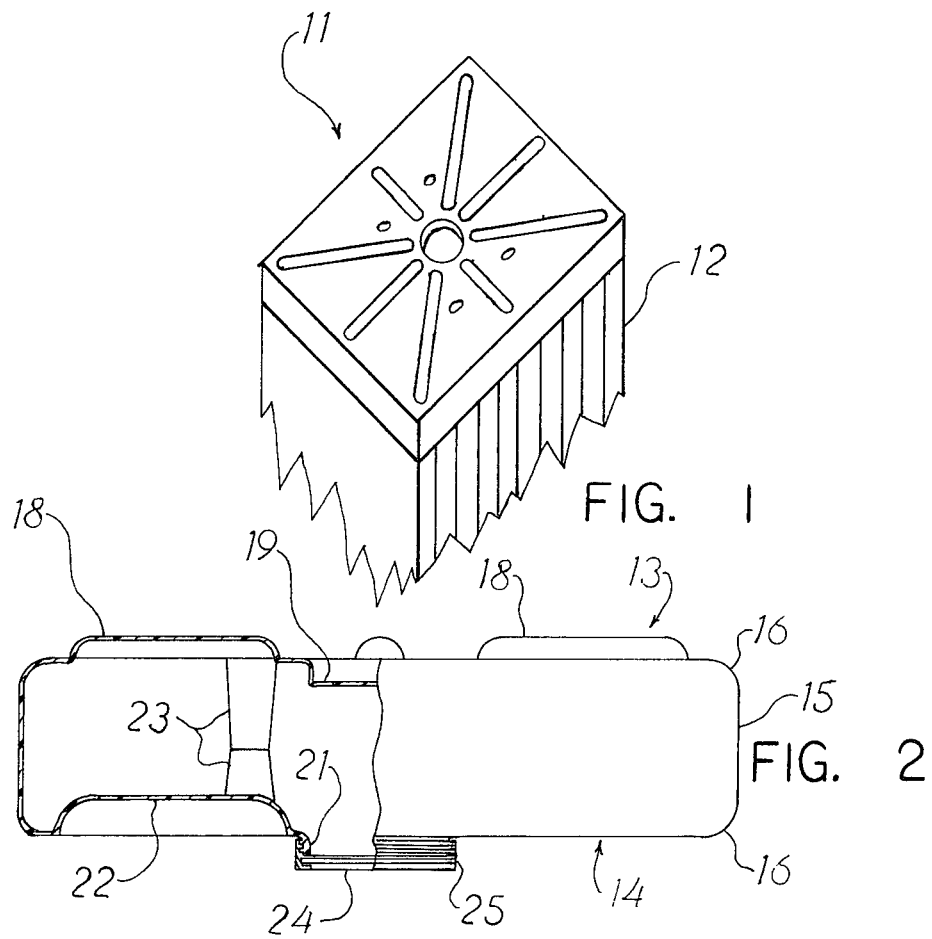
FIG. 1
FIG. 2
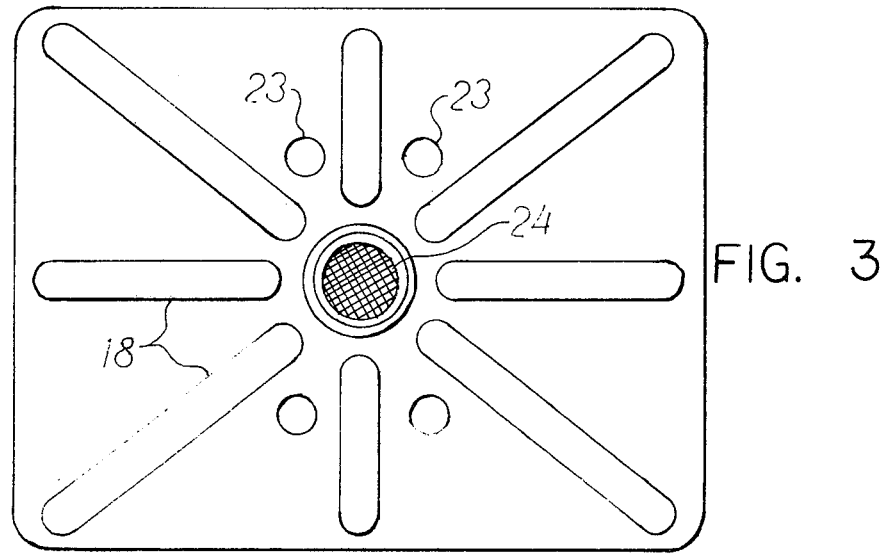
FIG. 3

BEE FEEDING APPARATUS

This invention relates to a novel bee feeder apparatus and more particularly relates to a new feeding apparatus for use with beehives.

One of the problems in the keeping of bees is obtaining the maximum amount of honey from each hive. In some situations, the bees in the hive feed on the honey therein which reduces the production of the honey. For example, during seasons in which the bees cannot feed on nectar, they will feed on honey in the hive. Generally, this occurs during fall, winter and spring when the bees are active but the flowers and plants are not producing the pollen on which the bees feed. This feeding of the bees on the honey is referred to as robbing the hive of honey.

Attempts have been made to supply the bees with an alternate source so they will not take the honey from the hive. This has involved making sugar solution available to the bees during these periods.

While the feeding of sugar solution to bees substantially eliminates the taking of honey, the feeding of such solutions has not been without its problems. For example, no devices designed to accomplish these purposes are available commercially. As a result, it is necessary for bee keepers to utilize make-shift devices in an attempt to solve the feeding problems.

One of the expedients used is to punch holes in the bottom of an ordinary pail and place the pail on top of the hive so that the bees can feed on the sugar solution through the holes. A second similar solution involves the use of new paint cans with holes punched in the bottom or a screen in a larger opening. The paint cans have the advantage of a tight fitting top which keeps the contents of the can free from contamination.

Although these containers do provide a make-shift solution to the problem of feeding bees, they do have a number of serious drawbacks. The containers are not very stable when they are placed on top of the hives and often are blown off the hives. This is particularly true as the amount of solution in the pail or can is reduced. Also the quantity of sugar solution is limited so it is necessary to refill the containers periodically during the non-nectar seasons. This requires return trips into the field with additional tanks of the solution. Since the non-pollen seasons are the seasons of inclement weather, it may be difficult or even impossible to get the necessary tanks trucks to the hives.

A further problem with such make-shift containers is forming the openings in the bottom. If the holes are not of proper size and number, the bees will have insufficient sugar solution on which to feed. Also, if the size and number of the openings are too large, an excess of sugar solution will seep through the openings and be lost. Thus, the above solutions to the problems require a great deal of trial and error before even a reasonable satisfactory solution to the problem can be achieved.

The present invention provides a novel bee feeding apparatus which makes the feeding of bees simple and convenient. The feeding apparatus of the invention minimizes labor costs associated with the feeding of the bees. Also, the feeding apparatus minimizes losses of sugar solution. Furthermore, the feeder of the invention eliminates the trial and error ordinarily associated with previous feeders. The feeding apparatus can be used conveniently even by unskilled help with a minimum of instruction.

The bee feeding apparatus of the invention is simple in design and relatively inexpensive to manufacture. The feeding apparatus can be fabricated from commercially available materials using conventional fabricating techinques.

Other benefits and advantages of the novel bee feeding apparatus of the present invention will be apparent from the following description and the accompanying drawings in which:

FIG. 1 is a view in perspective of one form of the bee feeding apparatus of the invention in position on a beehive;

FIG. 2 is an enlarged side view partially in section of the bee feeding apparatus shown in FIG. 1; and FIG. 3 is a bottom view of the bee feeding apparatus shown in FIG. 2.

As shown in the drawings, one form of the novel bee feeding apparatus 11 of the present invention is shown in position on a beehive 12. The dimensions of the apparatus are such that the feeder will rest on the top opening of the hive in a stable position. The feeding container includes major top and bottom portions 13 and 14 respectfully. The edges of the top and bottom portions 13 and 14 are joined by side wall portions 15. The sidewall portions have a height substantially less than the width thereof. Advantageously, the horizontal dimensions of the apparatus are between three and seven times that of the height thereof. The top and bottom portions 13 and 14 are joined with the sidewall portions 15 in a curved section 16 of substantial radius.

The top portion 13 includes a plurality of raised rib sections 18 symmetrically disposed about a recessed central section 19. Advantageously, the raised rib sections 18 extend radially from the recessed central section 19.

The bottom portion 14 includes a raised central opening 21 of a size slightly less than the recessed central section 19 of the top portion 13. The bottom portion 14 also includes a plurality of recessed rib sections 22 symmetrically disposed about the raised central opening 21. The recessed rib sections 22 are of a size slightly larger than the corresponding raised rib sections 18 of the top portion 13.

A plurality of reinforcing members extend from top portion 13 to bottom portion 14 at points intermediate the sidewall portions 15. Advantageously, the reinforcing members include recessed portions 23 extending from both the top portion 13 and the bottom portion 14 toward and into contact with one another as shown in FIG. 2.

Cover means with a plurality of substantially uniform openings is disposed over the raised central opening 21. The openings may be holes drilled into a solid cover. More advantageously, a screen 24 provides a plurality of openings uniformly distributed over the surface of the central opening 21. Preferably, the screen has a mesh size of about 40 and is made of a corrosion-resistant material such as bronze, stainless steel, etc. Suitable drilled holes have a diameter of about 1/16 inch.

When a screen 24 is employed, it may be secured in position in contact with the central opening 21, with fastening means such as a threaded ring 25 which engages corresponding threads on the portion surrounding raised central opening 21.

In the operation of the novel bee feeding apparatus shown in the drawings, the fastening ring 25 and screen 24 are removed from the container. The container then is filled with a sugar solution and the screen and sealing ring are replaced. The filled containers are loaded onto a truck or other wheeled vehicle for transfer to the fields in which the hives are located. Since the recessed rib sections 22 of the bottom portion 14 are slightly larger than the raised rib sections 18 of the top portion 13, the filled containers can be stacked easily since the top portion 13 has a recessed section 19 which mates with the raised central portion 21 of the bottom portion 14.

When the feeders have been transported to the hives, an opening is cut in the top of each hive and the feeder positioned over the opening with the screen of the container extending downwardly into the hive. Alternatively, the cover can be removed and strips fastened to the hive interior to support the feeder. Where the feeder is to remain on the hive over the winter, it is desirable to replace the cover to provide greater protection against inclement weather.

Since the container is air tight except for the screened opening 21, placing the container over the hive with the opening downward will cause a vacuum to form over the solution in the container and prevent or minimize the flow of solution from the opening. However, bees have access to the solution through the openings in the screen and thereby obtain sugar solution so that they do not take honey from the hive.

Advantageously, the feeding apparatus is molded from a plastic material which is shock resistant, with the container being molded as an integral unit. Preferably, the raised rib sections and the recessed rib sections are molded in generally semi-cylindrical configurations and the bottom tapered.

The above description and the accompanying drawings show that the present invention provides a novel bee feeding apparatus which makes the feeding of bees simple and convenient. The feeder of the invention eliminates the trial and error ordinarily associated with make-shift feeders. Furthermore, the feeding apparatus greatly reduces losses of sugar solution and minimizes labor costs involved in the feeding of bees.

The bee feeding apparatus of the invention is simple in design and can be fabricated from commercially available materials using conventional industrial techniques. The feeding apparatus is relatively inexpensive to fabricate. Also, the feeding apparatus can be used conveniently even by unskilled persons with a minimum of instruction.

It will be apparent that various modifications can be made in the particular bee feeding apparatus described in detail above and shown in the drawings within the scope of the invention. For example, the size and configuration of portions of the apparatus can be changed to meet specific requirements. Also, the structural materials can be different for particular end uses. In addition, the arrangement of the raised and recessed rib sections and the number thereof also can be changed as desired. Therefore, the scope of the invention is to be limited only by the following claims.

What is claimed is:

1. A bee feeding apparatus including a liquid container formed of a shock resistant plastic material with a single opening and having a configuration including major top and bottom portion of a size substantially the same as the top opening of a beehive, the edges of the top and bottom portions being joined by sidewall portions having a height substantially less than the width thereof, said top and bottom portion being joined with said sidewall portions in a curved section of substantial radius, said top portion including a plurality of rib sections symmetrically disposed about a recessed central section, said bottom portion including a raised central opening of a size slightly less than the recessed central sections of said top portion, said bottom portion including a plurality of rib sections symmetrically disposed about said raised central opening thereof, the rib sections in one of said top or bottom portions being raised and in the other portion being recessed, said recessed rib sections being of a size slightly larger than the corresponding raised rib sections of said top portion, a plurality of reinforcing members extending from said top portion to said bottom portion at points intermediate of said sidewall portion, cover means with a plurality of substantially uniform openings disposed over said raised central opening and means for securing said cover to said central opening, said plurality of uniform openings in said cover means being of a size sufficiently small so that when said apparatus is in an operative position and a substantial vacuum forms above the liquid in said container, there will be no significant flow or dripping of said liquid through said plurality of openings.

2. A bee feeding apparatus according to claim 1 wherein said container is molded as an integral unit.

3. A bee feeding apparatus according to claim 1 wherein said reinforcing members are located symmetrically with respect to said central opening and said recessed central section.

4. A bee feeding apparatus according to claim 1 wherein said raised rib sections of said top portion and said recessed rib sections of said bottom portion extend radially from the center thereof.

5. A bee feeding apparatus according to claim 1 wherein said raised rib sections and said recessed rib sections have a generally semi-cylindrical configuration.

6. A bee feeding apparatus according to claim 1 wherein the horizontal dimensions of said container are between about three and seven times of that of the height of said container.

7. A bee feeding apparatus according to claim 1 wherein said reinforcing members include recessed portions extending from the top and bottom portions toward and into contact with each other.

8. A bee feeding apparatus according to claim 1 wherein said plurality of openings in said cover means are formed with screen.

* * * * *